June 17, 1930. C. H. ARBUTHNOT 1,764,381
UNIVERSAL JOINT
Filed May 24, 1928 2 Sheets-Sheet 1
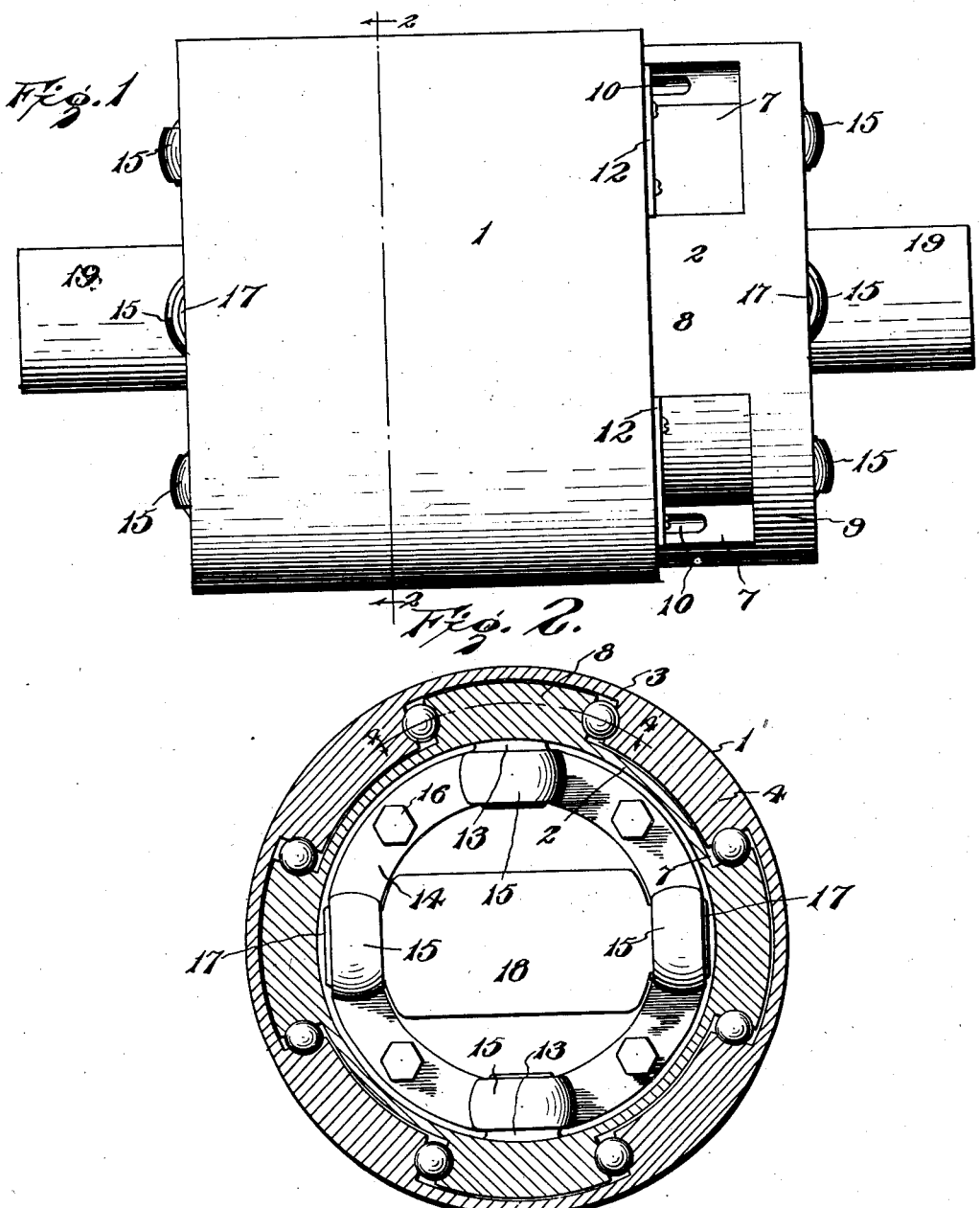

June 17, 1930.  C. H. ARBUTHNOT  1,764,381
UNIVERSAL JOINT
Filed May 24, 1928  2 Sheets-Sheet 2
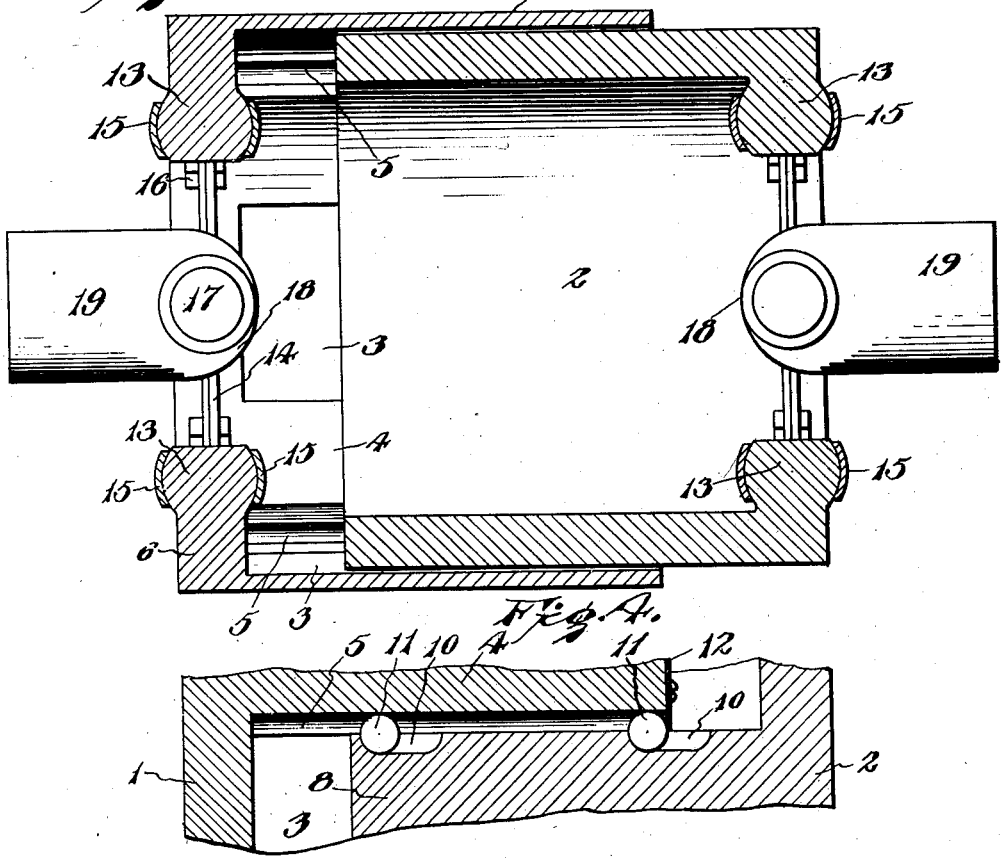
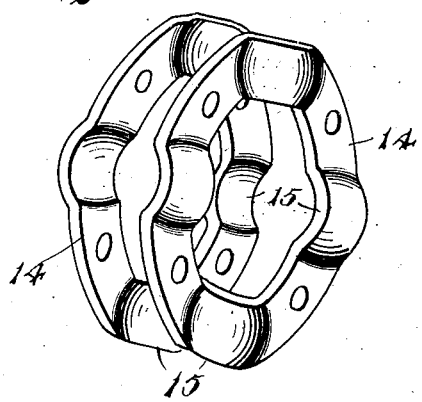
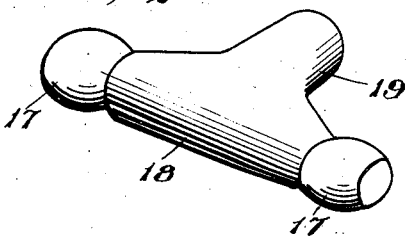
Inventor
C. H. Arbuthnot
By Lacey & Lacey, Attorneys Patented June 17, 1930

1,764,381

UNITED STATES PATENT OFFICE

CLAUDE H. ARBUTHNOT, OF LAKE ALFRED, FLORIDA

UNIVERSAL JOINT

Application filed May 24, 1928. Serial No. 280,275.

This invention is a universal joint having for its object the provision of a simple inexpensive structure whereby a driven rotatable element may be connected with a driving rotatable element so as to be positively rotated whether it is alined with or parallel to the driving element or in angular offset relation thereto. The invention provides a universal joint or coupling which permits wide flexibility in the angular adjustment of the driving and driven elements and automatically accommodates itself to the increase or decrease in the distance between the connected elements, the driven element being positively rotated in synchronism with the driving element in all angular relations so that the speed of the two parts is not only the same with respect to a complete revolution but also at all points of the revolution. Incidental objects of the invention will appear in the course of the following description.

In the accompanying drawings:

Figure 1 is an elevation of a universal joint embodying the invention;

Fig. 2 is a transverse section on the line 2—2 of Fig. 1;

Fig. 3 is a longitudinal section;

Fig. 4 is a detail section on the line 4—4 of Fig. 2;

Fig. 5 is a detail of one of the universal rings, and

Fig. 6 is a detail of one end of a driving or driven rotatable element.

In carrying out the invention, I provide an outer coupling member or sleeve 1 and an inner coupling member or sleeve 2 which are of counterpart formation and are slidably connected. The outer sleeve or coupling member 1 is constructed in its inner peripheral surface with longitudinal grooves or recesses 3 alternating with ribs or arms 4 and in the side edges of the ribs which constitute the side walls of the grooves or recesses are longitudinal grooves 5 for a purpose which will presently appear, the recesses and grooves being closed at one end by an annular wall 6 and being open at their opposite ends. It is to be understood, however, that the webs connecting the ribs or arms, while lending strength to the device, may be omitted. The inner coupling sleeve or member is provided in its outer circumference with longitudinal recesses or chambers 7 alternating with ribs or arms 8, the ribs 8 fitting in the recesses or longitudinal chambers 3 and the recesses or chambers 7 receiving the ribs 4, as will be best understood upon reference to Fig. 2. The chambers 7 are open at their inner ends but at their outer ends are closed by the annular wall portion 9 of the coupling sleeve or member, and it will be understood that the intervening webs shown in the drawings may be omitted. In the side edges of the ribs 8 are formed grooves or recesses 10 extending longitudinally of the member and mating with the grooves 5 in the ribs 4, as shown most clearly in Fig. 4, and they may be of any desired length as may be found most desirable under any given conditions. Fitted in the grooves 5 and 10 are anti-friction balls 11 which serve to reduce the frictional wear and resistance between the mating parts and also serve as stops to prevent complete separation of the parts. It is to be understood, however, that the ribs might be connected merely with a tongue and groove joint or otherwise arranged as might be preferred. In assembling the parts, the coupling sleeve 1 is set on end with the open end uppermost. The inner sleeve 2 is then inserted in the upper end of the outer sleeve so that the grooves 10 therein will register with the ends of the mating grooves 5 and the balls 11 may be inserted. The inner sleeve is then lowered within the outer sleeve until the outer grooves 10 register with the grooves 5, whereupon additional balls may be inserted. Cap plates 12 are then secured to the ends of the ribs 4 so as to project over the ends of the grooves 5 therein and thereby prevent the balls working out of said grooves so that the coupling sleeves will be permanently retained in cooperating relation. The cap plates 12 may be merely flat plates secured to the ribs or may take any other form which may be preferred.

At the outer end of each coupling sleeve or member are studs 13 which are substantially spherical in form and fitted to said studs are universal rings 14 each of which consists of mating flat bands having offsets 15 at intervals to engage around the studs 13 and thereby secure the rings to the studs and the coupling sleeves. The bands are firmly secured together by bolts 16 inserted through the flat portions thereof between the hemispherical offsets, as shown clearly in Figs. 2 and 3, and the offsets engaging the studs 13 are disposed at diametrically opposite points of the rings. Other offsets 15 are arranged at angles of ninety degrees to the offsets engaging the studs 13 and these latter offsets engage around studs 17 formed at opposite sides of heads 18 which may be the ends of the rotatable driving and driven elements or may be parts of coupling members which are secured to said elements, the drawings showing arms 19 which may be secured in any convenient manner to the respective rotatable elements. These elements at the outer ends of the coupling members are duplicates in all essential respects, except that the studs 13 on the outer member or the wall 6 thereon are radially of greater extent than the studs 13 on the inner member so that the offsets 15 will be all at the same distance from the axis of the coupling and the universal rings may be used interchangeably at either end of the structure. Uniformity in the motion of the driving and driven elements is also thereby attained.

Power may be applied to either end of the device and taken off at the opposite end. The interengaging ribs or arms on the coupling members provide means whereby the rotation of one member will be imparted directly to the other member and also furnishes an extended engagement between the parts so that bending and twisting of either part is avoided, notwithstanding that the joint may be extended due to relative deflection of the rotatable elements. It will be noted that the universal rings 14 are disposed at the extreme outer ends of the respective coupling members so that a wide angle of deflection will be accommodated as the driving and driven elements assume relatively offset or angular positions and the coupling sleeves may move longitudinally relative to each other as the rotatable elements move out of alinement. Removal of the screws or other fastenings which hold the cap plate or retainers 12 will permit separation of the coupling members, and removal of the bolts 16 which connect the separate members of the universal rings will disassemble the rings from the coupling sleeves and from the rotatable elements so that the parts may be very easily and quickly assembled or disassembled. The structure is very simple and compact and provides great strength with minimum weight. The joint may be used wherever power is to be transmitted from one rotatable element to another rotatable element which is subject to relative angular movement, but is intended more particularly for use in transmitting power through the steering knuckle to the front wheel assembly of automotive vehicles and thereby avoid difficulties heretofore experienced with four-wheel drives.

Having thus described the invention, I claim:

1. A universal joint comprising coupling sleeves telescopically fitted together, universal rings one mounted in the outer end of each sleeve, and rotatable elements each having a head pivotally engaged in and held by one of said rings.

2. A universal joint comprising coupling sleeves each having alternate longitudinal chambers and ribs with the ribs of one sleeve slidably fitting in the longitudinal chambers of the other sleeve, means to prevent detachment of the sleeves, universal rings fitted in the outer ends of the sleeves, and rotatable elements mounted in the respective rings.

3. A universal joint comprising inner and outer sleeves provided with interengaging ribs on their opposed longitudinal surfaces, said ribs being provided with longitudinal grooves in their edges, anti-friction rolling elements fitted in said grooves, means to retain said elements in the grooves, universal rings fitted in the outer ends of the respective sleeves, and rotatable elements mounted in said rings.

4. A universal joint comprising coupling members telescopically fitted together and provided at their outer ends each with diametrically opposite studs, universal rings having offset portions with diametrically opposite offset portions fitted about said studs, and rotatable elements having heads provided at their ends with studs engaged in offset portions of the universal rings alternating with the offset portions engaging the first-mentioned studs.

5. A universal joint including coupling members telescopically fitted together, inwardly extending studs at the outer ends of the members, said studs having substantially spherical extremities, universal rings having substantially spherical offset portions fitting around said studs, and rotatable elements provided with diametrical heads having sperical extremities engaged in offset portions of the universal rings arranged alternately with the offset portions engaging the studs on the coupling sleeves.

In testimony whereof I affix my signature.

CLAUDE H. ARBUTHNOT. [L. S.]